(12) United States Patent
Li (10) Patent No.: US 12,272,274 B2
(45) Date of Patent: Apr. 8, 2025

(54) DISPLAY DEVICE IMPROVING POOR DISPLAY INCURRED BY DEFORMATION OF DISPLAY SCREEN DURING DROP PROCESS

(71) Applicant: WUHAN CHINA STAR OPTOELECTRONICS SEMICONDUCTOR DISPLAY TECHNOLOGY CO., LTD., Wuhan (CN)

(72) Inventor: Jiang Li, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 198 days.

(21) Appl. No.: 17/780,271

(22) PCT Filed: May 20, 2022

(86) PCT No.: PCT/CN2022/094127
§ 371 (c)(1),
(2) Date: May 26, 2022

(87) PCT Pub. No.: WO2023/201827
PCT Pub. Date: Oct. 26, 2023

(65) Prior Publication Data
US 2023/0343249 A1 Oct. 26, 2023

(30) Foreign Application Priority Data
Apr. 22, 2022 (CN) .......................... 202210431868.1

(51) Int. Cl.
*G06F 1/16* (2006.01)
*G09F 9/30* (2006.01)

(52) U.S. Cl.
CPC ............ *G09F 9/301* (2013.01); *G06F 1/1624* (2013.01); *G06F 1/1641* (2013.01); *G06F 1/1652* (2013.01)

(58) Field of Classification Search
CPC .... G06F 1/1624; G06F 1/1641; G06F 1/1652; G09F 9/301
See application file for complete search history.

(56) References Cited

U.S. PATENT DOCUMENTS 9,119,316 B2 * 8/2015 Lee ..................... H04M 1/0268
2016/0378203 A1 12/2016 Kim et al.
(Continued)

FOREIGN PATENT DOCUMENTS

CN 103582340 A 2/2014
CN 104898784 A 9/2015
(Continued)

OTHER PUBLICATIONS

PCT International Search Report for International Application No. PCT/CN2022/094127, mailed on Dec. 15, 2022, 10pp.
(Continued)

*Primary Examiner* — James Wu
*Assistant Examiner* — Dakota M Talbert
(74) *Attorney, Agent, or Firm* — The Roy Gross Law Firm, LLC; Roy D. Gross (57) ABSTRACT

A display device is provided. The display device includes a middle frame component, a slide component, elastic elements, and a display screen. The middle frame component includes at least two middle frame bodies connected rotatably. The slide component includes at least two slide elements. The slide elements are slidably connected to the middle frame bodies correspondingly. The elastic elements are connected between the middle frame bodies and the slide elements. The display screen is connected to the slide
(Continued)

component. By disposing the slide component, poor display incurred by occurrence of deformation is prevented when the display screen drops.

20 Claims, 7 Drawing Sheets

(56) References Cited

U.S. PATENT DOCUMENTS

2018/0341293 A1* 11/2018 Kim ................. G06F 1/1652
2021/0351241 A1* 11/2021 Cho ................. G06F 1/1652

FOREIGN PATENT DOCUMENTS

| CN | 107564423 A | | 1/2018 |
| CN | 114203051 A | | 3/2022 |
| CN | 114333607 A | * | 4/2022 |

OTHER PUBLICATIONS

PCT Written Opinion of the International Searching Authority for International Application No. PCT/CN2022/094127, mailed on Dec. 15, 2022, 9pp.

* cited by examiner

DISPLAY DEVICE IMPROVING POOR DISPLAY INCURRED BY DEFORMATION OF DISPLAY SCREEN DURING DROP PROCESS

CROSS REFERENCE TO RELATED APPLICATIONS

This application is a National Phase of PCT Patent Application No. PCT/CN2022/094127 having International filing date of May 20, 2022, which claims the benefit of priority of Chinese Patent Application No. 202210431868.1, filed Apr. 22, 2022, the contents of which are all incorporated herein by reference in their entirety.

BACKGROUND OF INVENTION

Field of Invention

The present application relates to a display field, and specifically to a display device.

Description of Prior Art

With development of display technology, foldable display devices are gradually favored. Currently, rotating shafts are generally adopted in the foldable display devices for connecting two parts of middle frame structures. In order to avoid interference during folding, a gap is present between the middle frame structures. When the foldable display devices are unfolded and performed in directional drop, deformation and displacement can be present in the middle frame structures. However, as display screens and the middle frame structures in the display devices are only fixed by plastic frames, the display screens can be deformed due to the displacement and the deformation of the middle frame structures during the dropping process. Furthermore, the deformation can be concentrated in bending regions of the display screens, resulting in poor display appearing on the display screens.

SUMMARY OF INVENTION

Embodiments of the present application provide a display device, which can solve the problem of poor display incurred by the display screen being easily deformed during the drop process in current display devices.

One embodiment of the present disclosure provides a display device, including:
- a middle frame component including at least two middle frame bodies connected rotatably, wherein a first gap is between the two middle frame bodies connected rotatably, and the middle frame bodies have a support surface;
- a slide component disposed on the support surface of the middle frame bodies, wherein the slide component includes at least two slide elements, the slide elements are slidably connected to the middle frame bodies correspondingly, and a sliding direction of the slide elements forms an included angle with an extending direction of the first gap;
- elastic elements connected between the middle frame bodies and the slide elements to make the slide elements slide along a direction away from the first gap; and
- a display screen connected to a side of the slide component facing away the support surface.

Optionally, in some embodiments of the present application, the sliding direction of the slide elements is perpendicular to the extending direction of the first gap.

Optionally, in some embodiments of the present application, the slide elements include at least two sub-slide elements sequentially disposed along the extending direction of the first gap, the sub-slide elements are slidably connected to the middle frame bodies, and the elastic elements are disposed between the sub-slide elements and the middle frame bodies to make the sub-slide elements slide along the direction away from the first gap.

Optionally, in some embodiments of the present application, first grooves are defined at positions where the support surface of the middle frame bodies corresponds to the sub-slide elements, the first grooves extend along a sliding direction of the sub-slide elements, first slide portions are protrusively disposed at positions where a side of the sub-slide elements facing toward the support surface corresponds to the first grooves, the first slide portions are inserted into the first grooves to make the sub-slide elements be slidably connected to the middle frame bodies.

Optionally, in some embodiments of the present application, the first grooves penetrate through a side of the support surface along the sliding direction of the sub-slide elements.

Optionally, in some embodiments of the present application, the first grooves have two first lateral walls opposite to each other, the first lateral walls extend along the sliding direction of the sub-slide elements, a first sub-groove is defined on at least one of the first lateral walls, an extending direction of the first sub-groove is consistent with an extending direction of the first grooves, the first slide sub-portions are inserted into the first sub-grooves.

Optionally, in some embodiments of the present application, the first sub-grooves are defined on the two first lateral walls opposite to each other of the first grooves.

Optionally, in some embodiments of the present application, an end of the elastic elements is connected to the lateral walls of the first grooves close to the first gap, and another end of the elastic elements is connected to a side of the first slide portions close to the first gap to make the first slide portions slide along a direction away from the first gap.

Optionally, in some embodiments of the present application, an end of the elastic elements is connected to the lateral walls of the first grooves away from the first gap, and another end of the elastic elements is connected to a side of the first slide portions away from the first gap to make the first slide portions slide along a direction away from the first gap.

Optionally, in some embodiments of the present application, a plurality of the first slide portions are protrusively disposed at positions where a side of the sub-slide elements facing toward the support surface corresponds to the first grooves, the plurality of the first slide portions are sequentially spaced apart along the sliding direction of the sub-slide elements, and the elastic elements are connected to the first slide portions close to the first gap.

Optionally, in some embodiments of the present application, a plurality of the first grooves are defined on the support surface, the first slide portions are disposed corresponding to the first grooves one by one.

Optionally, in some embodiments of the present application, the elastic elements are disposed between a side of each of the first slide portions close to the first gap and the lateral wall of a corresponding first groove close to the first gap.

Optionally, in some embodiments of the present application, the first grooves extend along the direction away from the first gap and penetrate through an edge of the support surface, a second gap is between a side of the first slide portions away from the first gap and the edge of the support surface, and a width of the second gap is greater than or equal to a width of the first gap in the sliding direction of the sub-slide elements.

Optionally, in some embodiments of the present application, the width of the second gap is greater than or equal to 1.5 mm and less than or equal to 2.5 mm.

Optionally, in some embodiments of the present application, second grooves are defined on a side of the sub-slide elements facing toward the support surface, the second grooves extend along the sliding direction of the sub-slide elements, second slide portions are protrusively disposed at positions corresponding to the second grooves on the support surface, and the second slide portions are inserted into the second grooves to make the sub-slide elements be slidably connected to the middle frame bodies.

Optionally, in some embodiments of the present application, the second grooves have two second lateral walls opposite to each other, the second lateral walls extend along the sliding direction of the sub-slide elements, a second sub-groove is defined on at least one of the second lateral walls, an extending direction of the second sub-groove is consistent with an extending direction of the second grooves, second slide sub-portions are protrusively disposed at positions where the second slide portions correspond to the second sub-grooves, and the second slide sub-portions are inserted into the second sub-grooves.

Optionally, in some embodiments of the present application, the slide elements include connection portions, the connection portions are connected between two adjacent sub-slide elements, an extending direction of the connection portions is consistent with the extending direction of the first gap.

Optionally, in some embodiments of the present application, the sub-slide elements and the connection portions are integrated in one piece.

Optionally, in some embodiments of the present application, the middle frame component includes a plurality of the middle frame bodies disposed in a juxtaposition manner along the sliding direction of the slide elements, and any two adjacent middle frame bodies are connected rotatably.

Optionally, in some embodiments of the present application, the display device further includes a plastic frame, the plastic frame is attached to a side of the slide elements facing away the support surface, and the display screen is attached to a side of the plastic frame facing away the slide elements.

In embodiments of the present application, the display device includes the middle frame component, the slide component, elastic elements, and the display screen. The middle frame component includes at least two middle frame bodies connected rotatably. The first gap is between the two middle frame bodies connected rotatably. The middle frame bodies have the support surface. The slide component is disposed on the support surface of the middle frame bodies. The slide component includes at least two slide elements. The slide elements are slidably connected to the middle frame bodies correspondingly. The sliding direction of the slide elements forms the included angle with the extending direction of the first gap. The elastic elements are connected between the middle frame bodies and the slide elements to make the slide elements slide along the direction away from the first gap. The display screen is connected to the side of the slide component facing away the support surface. In the present application, by disposing the slide component between the display screen and the middle frame component, the middle frame bodies are allowed to be able to slide relative to the slide elements. Meanwhile, the elastic elements make the slide elements slide away from the first gap between the two middle frame bodies. Therefore, the slide component always serving a stretching effect on the display screen is ensured when the display device is dropped, which prevents the display screen from occurrence of deformation and poor display appearing when the display device is dropped.

DESCRIPTION OF DRAWINGS

To more clearly illustrate embodiments or the technical solutions of the present application, the accompanying figures of the present application required for illustrating embodiments or the technical solutions of the present application will be described in brief. Obviously, the accompanying figures described below are only part of the embodiments of the present application, from which figures those skilled in the art can derive further figures without making any inventive efforts.

description of reference numbers of accompanying figures:

| reference number | element name |
| --- | --- |
| 10 | display device |
| 100 | middle frame component |
| 110 | middle frame body |
| 111 | support surface |
| 112 | first groove |
| 113 | first lateral wall |
| 114 | first sub-groove |
| 115 | second slide portion |
| 116 | second slide sub-portion |
| 120 | first gap |
| 200 | slide component |
| 210 | slide element |
| 211 | sub-slide element |
| 212 | first slide sub- |

-continued

| reference number | element name |
| --- | --- |
| 213 | first slide sub-portion |
| 214 | second groove |
| 215 | second lateral wall |
| 216 | second sub-groove |
| 217 | connection portion |
| 218 | second gap |
| 300 | elastic element |
| 400 | plastic frame |
| 500 | display screen |

DETAILED DESCRIPTION OF EMBODIMENTS

The technical solutions in the embodiments of the present application are clearly and completely described in the following with reference to the accompanying drawings in the embodiments of the present application. Obviously, the described embodiments are only part of the embodiments of the present application, but not all embodiments of the present application. All other embodiments obtained by those skilled in the art based on the embodiments of the present application without creative efforts are within the scope of the present application. Besides, it should be understood that the specific embodiments described herein are merely for describing and explaining the present application and are not intended to limit the present application. In the present application, unless opposite stated, the orientation words used such as "upper" and "lower" generally refer to the upper and lower directions of the device in actual using or working state, and specifically refer to the drawing directions in the drawings, and "inner" and "outer" refer to the outline of the device.

Embodiments of the present application provide a display device, and detailed descriptions are provided below. It should be noted that a description order of the following embodiments is not intended to limit a preferred order of the embodiments.

Figure 1:
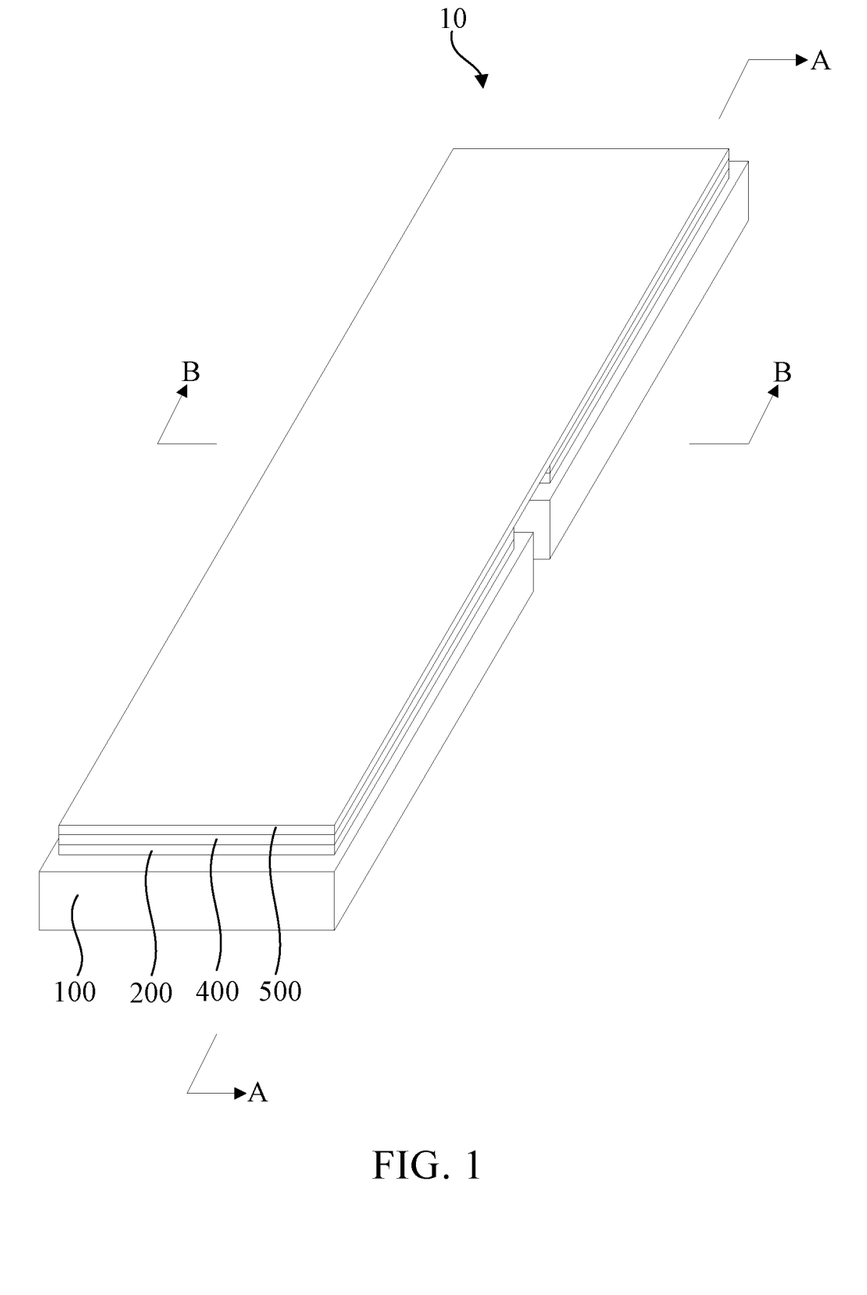
FIG. 1 is a structural schematic diagram of a display device provided by one embodiment of the present application.
Figure 2:
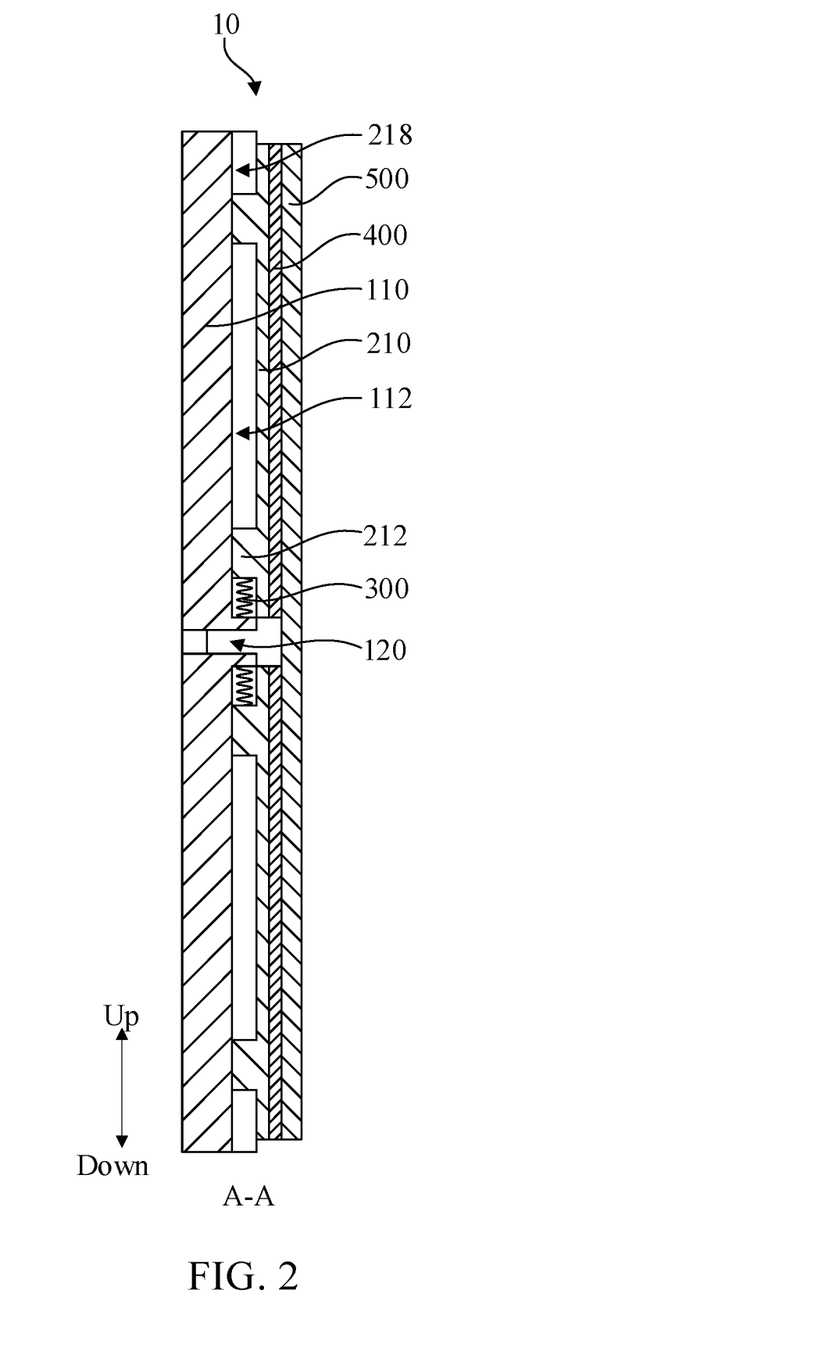
FIG. 2 is a schematic diagram along line A-A in FIG. 1 before dropping provided by one embodiment of the present application.
Figure 8:
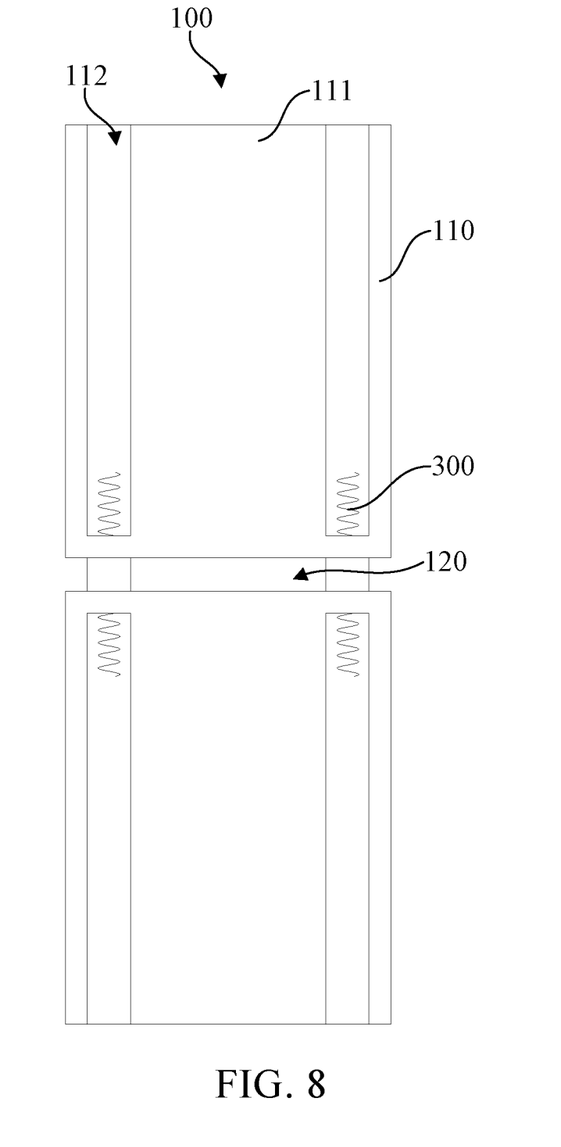
FIG. 8 is a structural schematic diagram of a middle frame component provided by one embodiment of the present application.

As illustrated in FIG. 1, FIG. 2, and FIG. 8, the display device 10 includes a middle frame component 100. The middle frame component 100 includes at least two middle frame bodies 110 connected rotatably. Rotation of the middle frame bodies 110 can ensure that the display device 10 can be folded when used. A first gap 120 is between the two middle frame bodies 110 connected rotatably, which can prevent interference between the two middle frame bodies from appearing when the display device 10 is folded. Wherein, the middle frame bodies 110 have a support surface 111, which is configured to support other structures in the display device 10 and ensures structural stability of the display device 10.

The display device 10 includes a slide component 200. The slide component 200 is disposed on the support surface 111 of the middle frame bodies 110. The slide component 200 includes at least two slide elements 210. The slide elements 210 are slidably connected to the middle frame bodies 110 correspondingly. By dividing the slide component 200 into the slide elements 210 respectively connected to the middle frame bodies 110, interference to the slide component 200 incurred by the rotation of the middle frame bodies 110 can be prevented, and normal use of the display device 10 can be ensured.

Wherein, a sliding direction of the slide elements 210 forms an included angle with an extending direction of the first gap 120. As the first gap 120 is present between the two middle frame bodies 110 that are rotatably connected, the two middle frame bodies 110 are connected by a structure such as a rotating shaft, and the structure such as the rotating shaft has low strength, the display device is prone to deform when is dropped. As a result, the two middle frame bodies 110 will move relative to each other until the two middle frame bodies 110 contact with each other, i.e., a movement direction of the middle frame bodies 110 and the extension direction of the first gap 120 form the included angle.

By configuring the included angle between the sliding direction of the slide elements 210 and the extending direction of the first gap 120, the sliding member 210 can slide relative to the middle frame bodies 110 during occurrence of a displacement process of the middle frame bodies 110. Therefore, the two slide elements 210 slidably connected the middle frame body 110 respectively are made to be relatively stable, thereby ensuring the structural stability of the structures connected to the slide elements 210.

It should be noted that, in one embodiment of the present application, the sliding direction of the slide elements 210 is perpendicular to the extending direction of the first gap 120, which is beneficial to consistent design of the moving direction of the middle frame bodies 110 and the sliding direction of the slide elements 210, and prevents mutual interference between the middle frame bodies 110 and the slide elements 210 when the display device 10 is dropped, thereby ensuring the structural stability of the whole display device 10.

The display device 10 includes elastic elements 300. The elastic elements 300 are connected between the middle frame bodies 110 and the slide elements 210 to make the slide elements 210 slide along the direction away from the first gap 120. That is, during a dropping process of the display device 10, an active force from the elastic elements 300 acting on the slide elements 210 is always in a direction away from the first gap 120, which prevents the slide elements 210 from moving toward a direction close to the first gap 120 with the middle frame component 100 together during a moving process of the middle frame component 100, thereby further ensuring relative stability of the slide component 200.

In addition, by connecting the elastic elements 300 between the middle frame bodies 110 and the slide elements 210, a supporting effect and a buffering effect for the slide elements 210 can further be served, which can not only prevent the slide elements 210 from moving with the middle frame bodies 110 due to its own weight during the dropping process of the display device 10, but can also ease impact force generated during the dropping process of the display device 10, thereby ensuring the stability of the overall structure of the display device 10.

The display device 10 further includes a display screen 500. The display screen 500 is connected to the side of the slide component 200 facing away the support surface 111. Wherein, the display screen 500 is a flexible structure, which makes the display screen 500 can be folded with the rotation of the middle frame component 100 to meet a folding function of the display device 10.

It should be noted that because the active force of the elastic elements 300 acting on the slide elements 210 is along the direction away from the first gap 120, after the display screen 500 is connected to the side of the slide component 200 away from the support surface 111, under active force applied by the slide elements 210, two ends of the display screen 500 can receive a tensile force. As the display screen 500 itself has a certain strength, it can also apply a reaction force towards the first gap 120 on the elastic elements 300, thereby force balance being made to be maintained on the elastic elements 300. Meanwhile, the display screen 500 can also remain flat under the action of the tensile force without occurrence of bending and deformation.

In the embodiment of the present application, by disposing the slide component 200 between the display screen 500 and the middle frame component 100, the middle frame bodies 110 are allowed to be able to slide relative to the slide elements 210. Meanwhile, the elastic elements 300 make the slide elements 210 slide away from the first gap between the two middle frame bodies. Therefore, the slide component 200 always serving a stretching effect on the display screen 500 is ensured when the display device 10 is dropped, which prevents the display screen 500 from occurrence of deformation and poor display appearing when the display device 10 is dropped.

Figure 9:
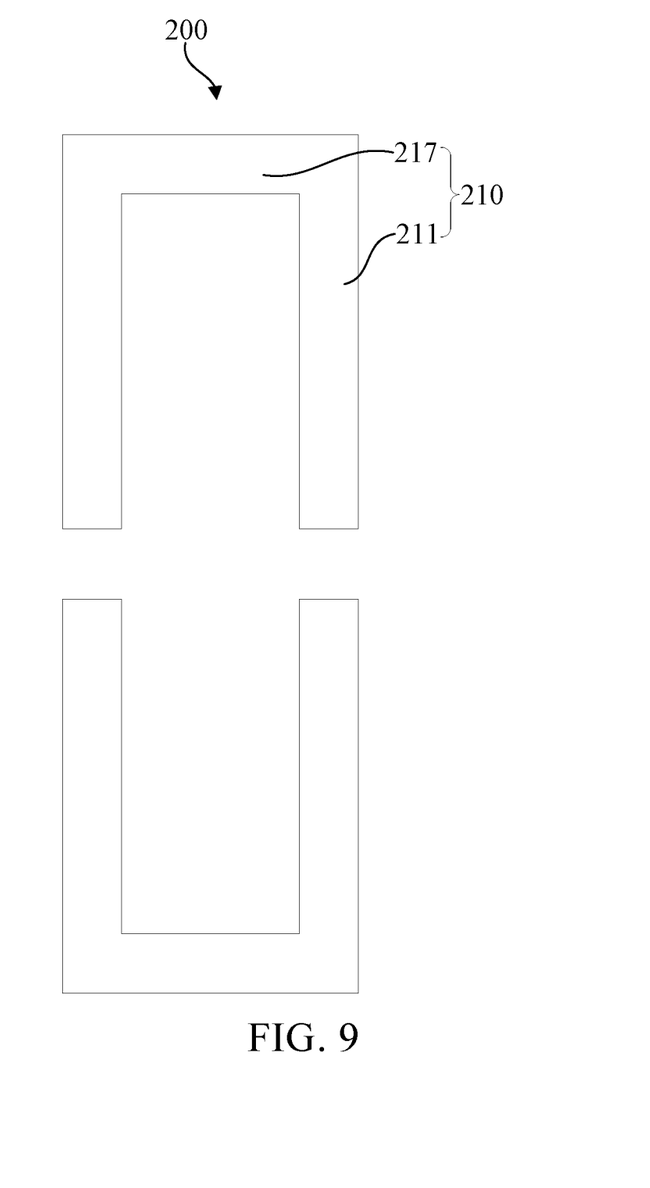
FIG. 9 is structural schematic diagram of a slide component provided by one embodiment of the present application.

Optionally, as illustrated in FIG. 2 and FIG. 9, the slide elements 210 include at least two sub-slide elements 211 sequentially disposed along the extending direction of the first gap 120, the sub-slide elements 211 are slidably connected to the middle frame bodies 100 correspondingly, i.e., the slide elements 210 are slidably connected to the middle frame bodies 110 simultaneously on at least two positions in the extending direction of the first gap 120 through at least two sub-slide elements 211. This configuration manner can not only improve stability of slide elements 210 and the middle frame bodies 110 during a sliding process, but can also increase a connection area and connection stability between the display screen 500 and the slide elements 210, thereby improving structural stability of the whole display device 10.

Wherein, the elastic elements 300 are disposed between the sub-slide elements 211 and the middle frame bodies 110 to make the sub-slide elements 211 slide along the direction away from the first gap 120, i.e., the elastic elements 300 are connected between each of the sub-slide elements 211 and the middle frame bodies 110. Under a same condition, the active force on one elastic element 300 can be reduced, thereby improving service life of the elastic elements 300. In addition, under effect of cooperating the two elastic elements 300, a buffering effect on the slide effects 210 during the dropping process of the display device 10 can also be enhanced, thereby improving the stability of the display device 10.

It should be noted that during usage and dropping of processes the display device 10, each sub-slide element 211 receives a same active force from the corresponding elastic elements 300, so as to ensure uniformity of force on the whole of the slide elements 210 and the display screen 500, thereby ensuring the structural stability of the display screen 500 and improving display effect of the display device 10.

Figure 4:
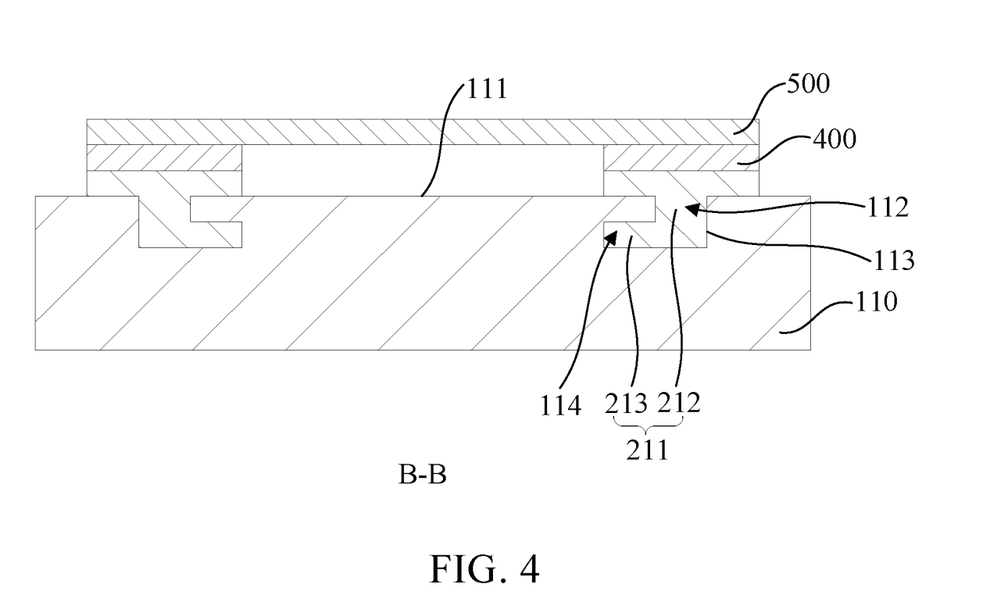
FIG. 4 is a schematic diagram along line B-B in FIG. 1 provided by one embodiment of the present application.
Figure 5:
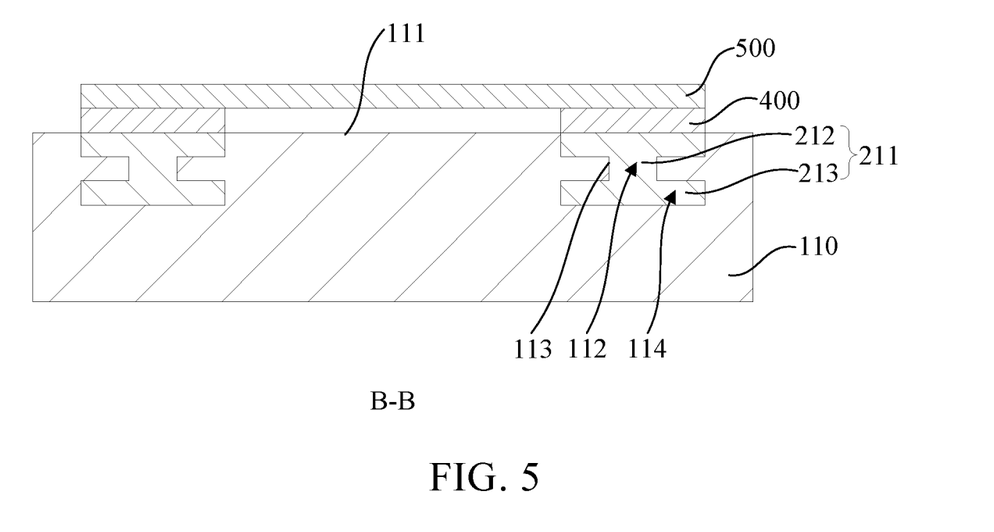
FIG. 5 is another schematic diagram along line B-B in FIG. 1 provided by one embodiment of the present application.
Figure 6:
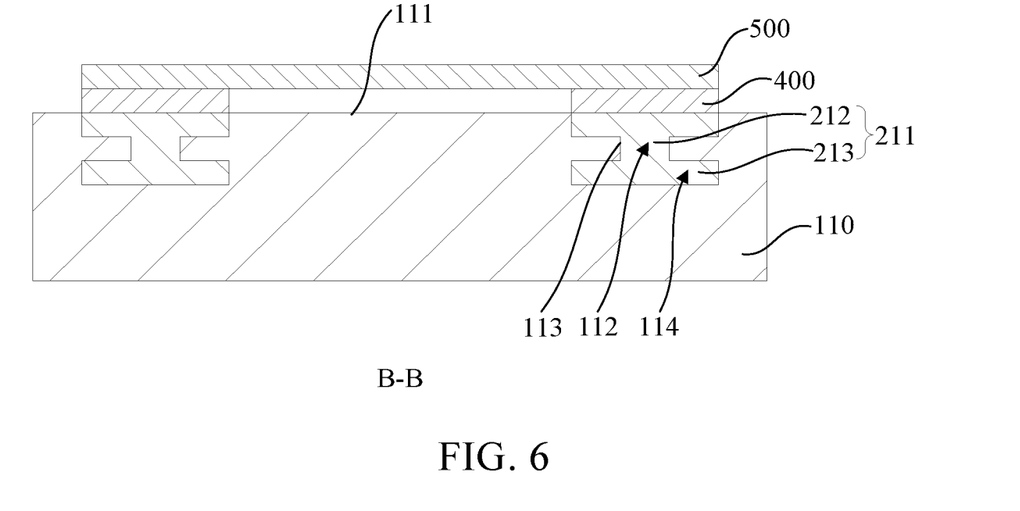
FIG. 6 is still another schematic diagram along line B-B in FIG. 1 provided by one embodiment of the present application.

Optionally, as illustrated in FIG. 4 to FIG. 6, first grooves 211 are defined at positions where the support surface 111 of the middle frame bodies 110 corresponds to the sub-slide elements 211, the first grooves 112 extend along a sliding direction of the sub-slide elements 211, first slide portions 212 are protrusively disposed at positions where a side of the sub-slide elements 211 facing toward the support surface 111 corresponds to the first grooves 112, the first slide portions 212 are inserted into the first grooves 112 to make the sub-slide elements 212 be slidably connected to the middle frame bodies 110. By defining the first grooves 112 on the support surface 111 of the middle frame bodies 110, and by inserting the first slide portions 212 on the sub-slide elements 211 into the first grooves 112, the first slide portions 212 can allow to move along the first grooves 112. This structural design can not only limit a slide trajectory of the sub-slide elements 211 and ensure slide stability of the sub-slide elements 211, but can also reduce a sum of the thicknesses of the middle frame bodies 110 and the sub-slide elements 211, thereby reducing an overall thickness of the display device 10.

Wherein, the first grooves 112 can penetrate through one side of the support surface 111 along the sliding direction of the sub-slide elements 211, and the first groove 112 extends continuously, which can not only ensure that the first slide portion 212 has sufficient slide space, but also facilitates to slidable installation of the sub-slide elements 211 and middle frame bodies 110.

Optionally, the first grooves 112 have two first lateral walls 113 opposite to each other, the first lateral walls 113 extend along the sliding direction of the sub-slide elements 211, a first sub-groove 114 is defined on at least one of the first lateral walls 113, and an extending direction of the first sub-groove 114 is consistent with an extending direction of the first grooves 112. First slide sub-portions 213 are protrusively disposed at positions where the first slide portions 212 correspond to the first sub-grooves 114. The first slide sub-portions 213 are inserted into the first sub-groove 114 to make the sub-slide elements 212 be slidably connected to the middle frame bodies 110. By coordination of the first sub-groove 114 and the first slide sub-portion 213, the stability during the sliding process of the sub-slide elements 211 relative to the middle frame bodies 110 can be enhanced, thereby improving the stability of the overall structure of the display device 10.

In some embodiments, the first sub-groove 114 is defined on only one first lateral wall 113. Correspondingly, the first slide sub-portion 213 is protrusively disposed on only one side of the first slide sub-portion 212, i.e., the first groove 112 and the first sub-groove 114 form an L-shaped groove together, and the first slide portion 212 and the first slide sub-portion 213 form an L-shaped slide portion together. This structural design can simplify the structure of the sub-slide elements 211 and improve production efficiency while ensuring the stability of the sub-slide elements 211 relative to the middle frame body 110 during sliding.

In some other embodiments, the first sub-grooves 114 are defined on two opposite first lateral walls 113 of the first grooves 112. Correspondingly, the first slide sub-portions 213 are protrusively disposed on two opposite sides of the first slide portion 212, i.e., the first groove 112 and the first sub-groove 114 form a T-shaped or I-shaped groove together, and the first slide portion 212 and the first slide sub-portion 213 form a T-shaped or I-shaped slide portion together. This structural design can further enhance the stability of the sub-slide elements 211 relative to the middle frame bodies 110 during sliding.

Optionally, as illustrated in FIG. 2, in this embodiment, an end of the elastic elements 300 is connected to the lateral walls of the first grooves 112 close to the first gap 120, and another end of the elastic elements 300 is connected to a side of the first slide portions 212 close to the first gap 120 to make the first slide portions 212 slide along a direction away from the first gap 120, i.e., when the first slide portions 212 are inserted into the first grooves 112, a gap is reserved between the side of the first slide portions 212 close to the first gap 120 and the lateral wall of the first grooves 112, and the elastic elements 300 are disposed in the gap and are respectively connected to the middle frame bodies 110 and the sub-slide elements 211.

As the elastic elements 300 make the sub-slide elements 211 slide in the direction away from the first gap 120, when the used elastic elements 300 are springs, the elastic elements 300 are always in a compressed state, i.e., in the usage process or the dropping process of the display device 10, the active force acted on the display screen 500 by the sub-slide elements 211 is always a tensile force, thereby ensuring that the display screen 500 is always in a flat state, and no abnormal display incurred by bending and deformation appears.

In some embodiments, an end of the elastic elements 300 is connected to the lateral walls of the first grooves 112 away from the first gap 120, and another end of the elastic elements 300 is connected to a side of the first slide portions 212 away from the first gap 120 to make the first slide portions 212 slide along a direction away from the first gap 120, i.e., when the first slide portions 212 are inserted into the first grooves 112, a gap is reserved between the side of the first slide portions 212 away from the first gap 120 and the lateral wall of the first grooves 112, and the elastic elements 300 are disposed in the gap and are respectively connected to the middle frame bodies 110 and the sub-slide elements 211.

When the used elastic elements 300 are springs, the elastic elements 300 are always in a stretched state, i.e., in the usage process or the dropping process of the display device 10, the active force acted on the display screen 500 by the sub-slide elements 211 is always a tensile force, thereby ensuring that the display screen 500 is always in the flat state, and no abnormal display incurred by bending and deformation appears.

Optionally, a plurality of the first slide portions 212 are protrusively disposed at positions where a side of the sub-slide elements 211 facing toward the support surface 111 corresponds to the first grooves 112, and the plurality of the first slide portions 212 are sequentially spaced apart along the sliding direction of the sub-slide elements 211, i.e., the sub-slide elements 211 are slidably connected to the middle frame bodies 110 through the plurality of first slide portions 212 to enhance the stability of the sub-slide elements 211 relative to the middle frame bodies 110 during sliding.

Wherein, a number of the first grooves 112 corresponding to the first slide portions 212 on the support surface 111 can be multiple, i.e., the first grooves 112 correspond to the first slide portions 212 one by one to reduce a risk of the sub-slide elements 211 sliding off from the support surface 111. Of course, the first grooves 112 defined on the support surface 111 can also extend continuously in the sliding direction of the sub-slide elements 211, i.e., the plurality of first slide portions 212 simultaneously slide in one first groove 112. This design manner can simplify the overall structure of the middle frame bodies 110, can reduce production difficulty, and also facilitates to installation of the sub-slide elements 211 and the middle frame bodies 110.

Optionally, the elastic elements 300 are connected to the first slide portions 212 close to the first gap 120, i.e., in the sliding direction of the slide elements 211, the elastic member 300 can be disposed only between the first slide portion 212 closest to the first gap 120 and the middle frame body 110, so that limitation to positions of the whole of sub-slide elements 212 is realized.

It should be noted that when the plurality of first grooves 112 are defined on the support surface 111, i.e., when the first slide portions 212 correspond to the first grooves 112 one by one, the elastic elements 300 can be disposed between the side of each first slide portion 212 close to the first gap 120 and the lateral wall of the first groove 112 close to the first gap 120. This structural design method can not only reduce the active force on one single elastic element 300 and improve the service life of the elastic elements 300, but can also enhance the overall buffering effect of the elastic elements 300 on the slide elements 210 during the dropping process of the display device 10, thereby improving the stability of the display device 10.

Optionally, the first grooves 112 extend along the direction away from the first gap 120 and penetrate through an edge of the support surface 111, i.e., the first grooves 112 extend along the sliding direction of the sub-slide elements 211 and penetrate through one side of the support surface 111 to facilitate the installation of the sub-slide elements 211 and the middle frame bodies 110. A second gap 218 is between a side of the first slide portions 212 away from the first gap 120 and the edge of the support surface 111 to form a sliding space when the sub-slide elements 211 slide relative to the middle frame bodies 110.

A width of the second gap 218 is greater than or equal to a width of the first gap 120 in the sliding direction of the sub-slide elements 211. In the dropping process of the display device 10, the maximum moving distance of the middle frame bodies 110 is the width of the first gap 120 between the two middle frame bodies 110. By configuring the width of the second gap 218 to be greater than or equal to the width of the first gap 120, when the middle frame bodies 110 slide relative to the sub-slide elements 211, the sub-slide elements 211 sliding off from the first groove 112, that can affect the structural stability and display effect of the display device 10, can be prevented.

Wherein, when the plurality of first slide portions 212 are disposed on the sub-slide elements 211, and one first groove 112 is defined on the support surface 111, the second gap 218 refers to a gap between the first slide portion 212 away from the first gap 120 and the edge of the support surface 111. When the plurality of first slide portions 212 are disposed on the sub-slide elements 211, and a plurality of the first groove 112 are defined on the support surface 111, the second gap 218 refers to a gap between a side of each first slide portion 212 away from the first gap 120 and the lateral wall of the corresponding first groove 112 to ensure normal slide between the sub-slide elements 211 and the middle frame bodies 110.

Optionally, the width of the second gap 218 is greater than or equal to 1.5 mm and less than or equal to 2.5 mm. If the width of the second gap 218 is too small, the sub-slide element 211 can slide off from the middle frame body 110 during the sliding process of the middle frame body 110 relative to the sub-slider 211, and even causing the display screen 500 to be bent and deformed, affecting overall display effect of the display device 10. If the width of the second gap 218 is too large, a size of the whole display device 10 can be too large, and size matching between the display screen 500 and the middle frame bodies 110 can be affected, thereby affecting appearance of the display device 10.

In the embodiment of the present application, the width of the second gap 218 can be configured to be 1.5 mm, 1.8 mm, 2 mm, 2.3 mm, or 2.5 mm, etc., which can not only ensure the effective sliding of the middle frame bodies 110 relative to the sub-slide elements 211 and avoid bending and deformation of the display screen 500, but also ensures the appearance of the overall structure of the display device 10. Wherein, the specific value of the width of the second gap 218 can be adjusted according to actual design requirements, which are not limited specifically herein.

Optionally, the slide element 210 includes a plurality of sub-slide elements 211, and the plurality of sub-slide elements 211 are sequentially spaced apart along the extending direction of the first gap 120. A plurality of first grooves 112 are defined at positions on the support surface 111 of the middle frame bodies 110 corresponding to the plurality of sub-slide elements 211, so that the plurality of sub-sliders 211 slide along the corresponding first grooves 112. This configuration manner can further improve stability of slide elements 210 and the middle frame bodies 110 during a sliding process, while can also increase a connection area and connection stability between the display screen 500 and the slide elements 210, thereby improving overall structural stability of the display device 10.

Wherein, specific structural configuration of each sub-slide elements 211 and a matching manner with the corresponding first grooves 112 on the support surface 111 can refer to the relevant descriptions in the aforesaid embodiments, and redundant description will not be mentioned herein again.

Figure 7:
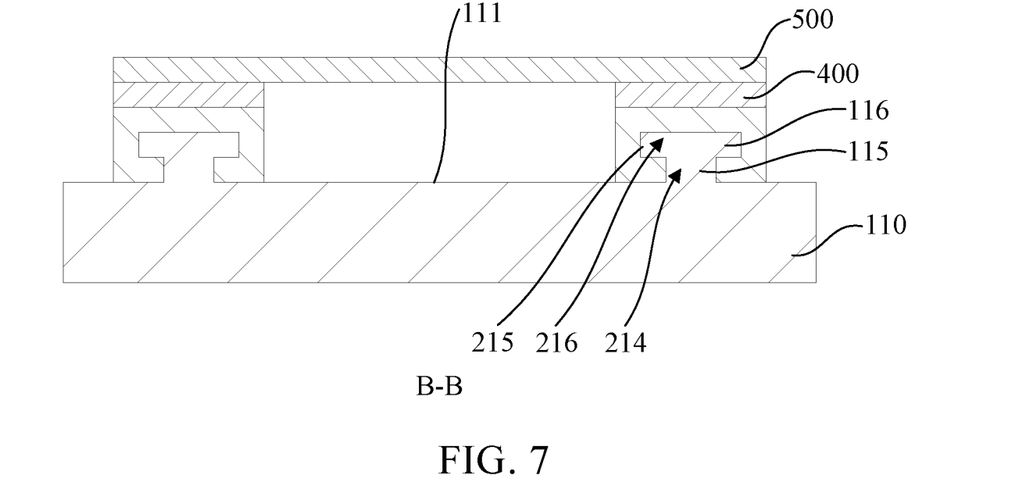
FIG. 7 is further another schematic diagram along line B-B in FIG. 1 provided by one embodiment of the present application.

Optionally, as illustrated in FIG. 7, second grooves 214 are defined on a side of the sub-slide elements 211 facing toward the support surface 111, and the second grooves 214 extend along the sliding direction of the sub-slide elements 211. Second slide portions 115 are protrusively disposed at positions corresponding to the second grooves 214 on the support surface 111, and the second slide portions 115 are inserted into the second grooves 214 to make the sub-slide elements 211 be slidably connected to the middle frame bodies 110. By defining the second grooves 214 in the sub-slide elements 211, and by inserting the second slide portions 115 on the support surface 111 of the middle frame bodies 110 into the second grooves 214, the second slide portion 115 is allowed to slide along the second groove 214. This structural design can not only limit a slide trajectory of the sub-slide elements 211 and ensure slide stability of the sub-slide elements 211, but can also reduce a sum of the thicknesses of the middle frame bodies 110 and the sub-slide elements 211, thereby reducing an overall thickness of the display device 10.

Wherein, the second grooves 214 can penetrate through a side of the sub-slide elements 211 along the sliding direction of the sub-slide elements 211, and the second groove 214 extends continuously, which can not only ensure that the second slide portion 115 has sufficient slide space, but also facilitates to slidable installation of the sub-slide elements 211 and middle frame bodies 110.

Optionally, the second grooves 214 have two second lateral walls 215 opposite to each other, the second lateral walls 215 extend along the sliding direction of the sub-slide elements 211, a second sub-groove 216 is defined on at least one of the second lateral walls 215, and an extending direction of the second sub-groove 216 is consistent with an extending direction of the second grooves 214. Second slide sub-portions 116 are protrusively disposed at positions where the second slide portions 115 correspond to the second sub-grooves 216, and the second slide sub-portions 116 are inserted into the second sub-grooves 216 to make the sub-slide elements 211 be slidably connected to the middle frame bodies 110. By coordination of the second sub-groove 216 and the second slide sub-portion 116, the stability during the sliding process of the sub-slide elements 211 relative to the middle frame bodies 110 can be enhanced, thereby improving the stability of the overall structure of the display device 10.

In some embodiments, the second sub-groove 216 is defined on only one second lateral wall 215. Correspondingly, the second slide sub-portion 116 is protrusively disposed on only one side of the second slide portion 115, i.e., the second groove 214 and the second sub-groove 216 form an L-shaped groove together, and the second slide portion 115 and the second slide sub-portion 116 form an L-shaped slide portion together. This structural design can simplify the structure of the sub-slide elements 211 and improve production efficiency while ensuring the stability of the sub-slide elements 211 relative to the middle frame body 110 during sliding.

In some other embodiments, the second sub-grooves 216 are defined on two opposite second lateral walls 215 of the second grooves 214. Correspondingly, the second slide sub-portions 116 are protrusively disposed on two opposite sides of the second slide portion 115, i.e., the second groove 214 and the second sub-groove 216 form a T-shaped or I-shaped groove together, and the second slide portion 115 and the second slide sub-portion 116 form a T-shaped or I-shaped slide portion together. This structural design can further enhance the stability of the sub-slide elements 211 relative to the middle frame bodies 110 during sliding.

It should be noted that the structural design and mutual cooperation between the second slide portion 115 and the second groove 214, and the connection manner of the elastic elements 300 between the second slide portion 115 and the second groove 214 can refer to relevant description of the first slide portion 212 and the first groove 112 in the aforesaid embodiments. It is only necessary to ensure the effective slide of the middle frame bodies 110 relative to the sub-slide elements 211 to prevent the display effect of the display screen 500 from being affected by bending and deformation during the usage or dropping processes of the display device 10, and redundant description will not be mentioned herein again.

Optionally, as illustrated in FIG. 9, the slide elements 210 further include connection portions 217, the connection portions 217 are connected between two adjacent sub-slide elements 211, and an extending direction of the connection portions 217 is consistent with the extending direction of the first gap 120, i.e., the sub-slide element 211 is connected to the connection portion 217 to form in one piece, so as to improve the structural stability of the slide elements 210, while can also improve the consistency of the plurality of sub-slide elements 211 relative to the middle frame bodies 110 during sliding.

Wherein, the manner of integrating the sub-slide elements 211 and the connection portion 217 in one piece is adopted to reduce an overall number of parts of the display device 10 and further improves the structural stability of the slide elements 210, thereby ensuring flatness of the display screen 500 connected to the slide elements 210 and improving the overall display effect of the display device 10.

Optionally, in one embodiment of the present application, the middle frame component 100 includes a plurality of the middle frame bodies 210 disposed in a juxtaposition manner along the sliding direction of the slide elements 210, and any two adjacent middle frame bodies 110 are connected rotatably. Correspondingly, the slide component 200 includes a plurality of the slide elements 210, and the slide elements 210 are slidably connected to the middle frame bodies 110 correspondingly one by one. By the rotational connection of the plurality of middle frame bodies 110, the requirements of the display device 10 for different sizes and shapes can be satisfied, so as to expand the application range of the display device 10.

Wherein, the elastic elements 300 are adopted to connect between each middle frame body 110 and the corresponding slide element 210 to ensure the relative stability between the slide elements 210, thereby preventing bending and deforming from appearing on the display screen 500 during the usage and dropping process of the display device 10 and affecting the display effect.

Optionally, as illustrated in FIG. 1 and FIG. 2, the display device 10 further includes a plastic frame 400, the plastic frame 400 is attached to a side of the slide elements 210 facing away the support surface 111 of the middle frame bodies 110, and the display screen 500 is attached to a side of the plastic frame 400 facing away the slide elements 210. Wherein, a shape of the plastic frame 400 can be designed according to a specific shape of the slide elements 210 to ensure connection stability between the display screen 500 and the slide elements 210. The plastic frame 400 can be an adhesive material with certain ductility such as a double-sided adhesive tape, so that the display screen 500 can still remain relatively stable under the stretching action of the slide elements 210.

Figure 3:
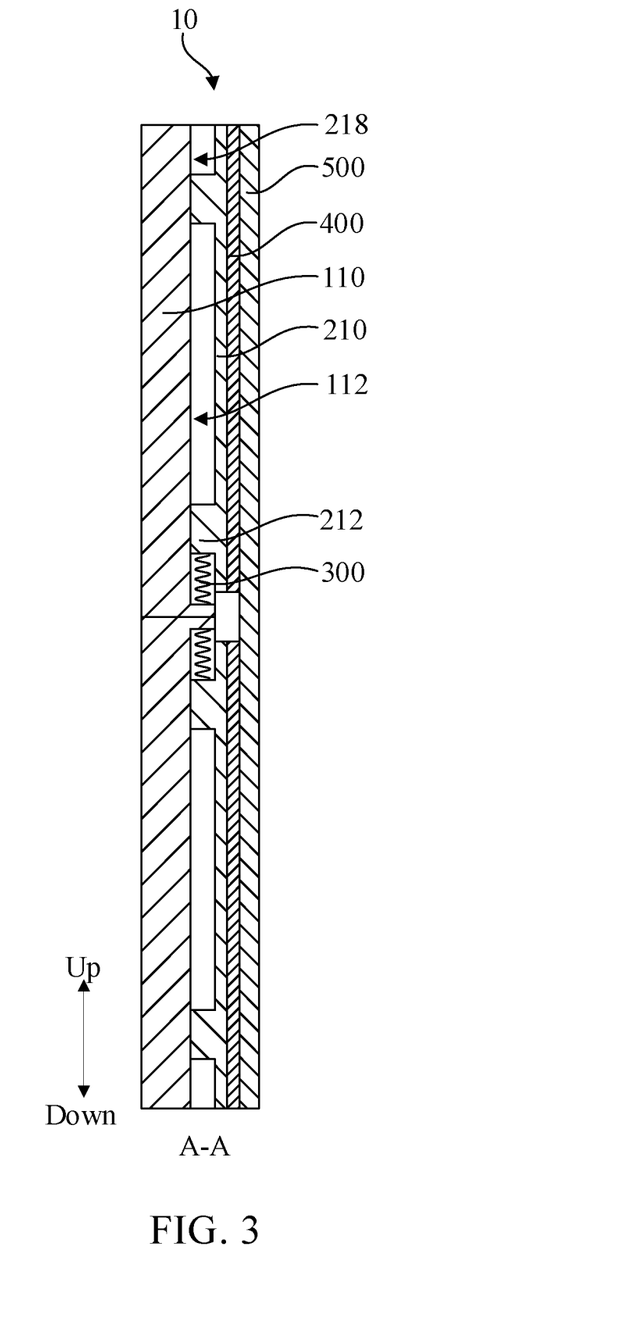
FIG. 3 is a schematic diagram along line A-A in FIG. 1 after dropping provided by one embodiment of the present application.

Specifically, taking the display device 10 including two middle frame bodies 110 as an example, before a drop test is performed, the structure of the display device 10 is as illustrated in FIG. 2. The first gap 120 is between the two middle frame bodies 110, the corresponding slide elements 210 are maintained relatively stable under effect performing by the spring and the display screen 500 together, and the spring is in a compressed state. During the drop test, the structure of the display device 10 is as illustrated in FIG. 3. The middle frame body 110 located above can move toward the middle frame body 110 at bottom under effect of impact force, and the rotating shaft connected between the two middle frame bodies 110 can be deformed until the two middle frame bodies 110 in contact with each other.

During the dropping process, the upper middle frame body 110 moves downward relative to the slide elements 210, and movement of the upper middle frame body 110 can drive the corresponding spring to move downward, so that a length of the spring becomes longer. However, the spring is still in a compressed state, compared to the upper middle frame body 110, the upper slide elements 210 located above slides upward relative to the middle frame body 110. At this time, because compression degree of the lower spring is greater than compression degree of the upper spring, the whole slide component 200 can move downward under the effect of the two springs together, so that the compression degrees of the two springs are the consistent, thereby making force balance to be able to maintain on the slide component 200. In this process, because the two springs are always in the compressed state, an upper side and a lower side of the display screen 500 are always received tensile force, and relative positions of the two slide elements 210 will not change, so abnormal display due to bending and deformation of the display screen 500 during the dropping process can be prevented.

It should be noted that, in the embodiments of the present application, the display device 10 has a wide range of applications, including flexible displays and lighting such as televisions, computers, mobile phones, or foldable or rollable displays, and wearable devices such as smart bracelets, smart watches, etc., all of them are within the scope of the application field to which the display device 10 in the embodiment of the present application belongs.

The display device provided by the embodiments of the present application is described in detail. This article uses specific cases for describing the principles and the embodiments of the present application, and the description of the embodiments mentioned above is only for helping to understand the method and the core idea of the present application. Meanwhile, for those skilled in the art, will have various changes in specific embodiments and application scopes according to the idea of the present disclosure. In summary, the content of the specification should not be understood as limit to the present application.

What is claimed is:

1. A display device, comprising:
   a middle frame component, comprising at least two middle frame bodies arranged side by side, wherein any two adjacent ones of the middle frame bodies are connected rotatably, and when the display device is unfolded, a first gap is between any two adjacent ones of the middle frame bodies, and the middle frame bodies have a support surface;
   a slide component, disposed on the support surface of the middle frame bodies, wherein the slide component comprises at least two slide elements, the slide elements are slidably connected to the middle frame bodies correspondingly, and a sliding direction of the slide elements forms an included angle with an extending direction of the first gap;
   elastic elements, connected between the middle frame bodies and the slide elements, wherein when the display device is unfolded, the elastic elements are configured to apply forces on the slide elements away from the first gap; and
   a display screen, connected to a side of the slide component facing away the support surface,
   wherein when the display device is unfolded, both outer ends of the middle frame component respectively extend beyond outer ends of the display screen in the sliding direction of the slide elements, and a sliding space is provided for the display screen sliding in the sliding direction of the slide elements on an outer side of each of the outer ends of the display screen.

2. The display device as claimed in claim 1, wherein the sliding direction of the slide elements is perpendicular to the extending direction of the first gap.

3. The display device as claimed in claim 1, wherein each of the slide elements comprises at least two sub-slide elements sequentially disposed along the extending direction of the first gap,
   the sub-slide elements are slidably connected to the middle frame bodies correspondingly, and
   the elastic elements are disposed between the sub-slide elements and the middle frame bodies to apply forces on the sub-slide elements away from the first gap when the display device is unfolded.

4. The display device as claimed in claim 3, wherein first grooves are defined at positions where the support surface of the middle frame bodies corresponds to the sub-slide elements, each of the first grooves extends along a sliding direction of the sub-slide elements, first slide portions are protrusively disposed at positions where a side of the sub-slide elements facing toward the support surface corresponds to the first grooves, and the first slide portions are inserted into the first grooves to make the sub-slide elements be slidably connected to the middle frame bodies.

5. The display device as claimed in claim 4, wherein each of the first grooves penetrates through an end of a corresponding one of the middle frame bodies facing away from the first gap.

6. The display device as claimed in claim 4, wherein the first grooves have two first lateral walls opposite to each other, the first lateral walls extend along the sliding direction of the sub-slide elements, a first sub-groove is defined on at least one of the first lateral walls, an extending direction of the first sub-groove is consistent with an extending direction of the first grooves, first slide sub-portions are protrusively disposed at positions where the first slide portions correspond to the first sub-grooves, the first slide sub-portions are inserted into the first sub-grooves.

7. The display device as claimed in claim 6, wherein the first sub-grooves are defined on the two first lateral walls opposite to each other of the first grooves.

8. The display device as claimed in claim 4, wherein an end of the elastic elements is connected to the lateral walls of the first grooves close to the first gap, and another end of the elastic elements is connected to a side of the first slide portions close to the first gap to make the first slide portions slide along a direction away from the first gap.

9. The display device as claimed in claim 4, wherein an end of the elastic elements is connected to the lateral walls of the first grooves away from the first gap, and another end of the elastic elements is connected to a side of the first slide portions away from the first gap to make the first slide portions slide along a direction away from the first gap.

10. The display device as claimed in claim 8, wherein a plurality of the first slide portions are protrusively disposed at positions where a side of the sub-slide elements facing toward the support surface corresponds to the first grooves, the plurality of the first slide portions are sequentially spaced apart along the sliding direction of the sub-slide elements, and the elastic elements are connected to the first slide portions close to the first gap.

11. The display device as claimed in claim 10, wherein a plurality of the first grooves are defined on the support surface, the first slide portions are disposed corresponding to the first grooves one by one.

12. The display device as claimed in claim 11, wherein the elastic elements are disposed between a side of each of the first slide portions close to the first gap and a lateral wall of a corresponding first groove close to the first gap.

13. The display device as claimed in claim 8, wherein the first grooves extend along the direction away from the first gap and penetrate through an edge of the support surface, a second gap is between a side of the first slide portions away from the first gap and the edge of the support surface when the display device is unfolded, and a width of the second gap is greater than or equal to a width of the first gap in the sliding direction of the sub-slide elements.

14. The display device as claimed in claim 13, wherein the width of the second gap is greater than or equal to 1.5 mm and less than or equal to 2.5 mm.

15. The display device as claimed in claim 3, wherein second grooves are defined on a side of the sub-slide elements facing toward the support surface, the second grooves extend along the sliding direction of the sub-slide elements, second slide portions are protrusively disposed at positions corresponding to the second grooves on the support surface, and the second slide portions are inserted into the second grooves to make the sub-slide elements be slidably connected to the middle frame bodies.

16. The display device as claimed in claim 15, wherein the second grooves have two second lateral walls opposite to each other, the second lateral walls extend along the sliding direction of the sub-slide elements, a second sub-groove is defined on at least one of the second lateral walls, an extending direction of the second sub-groove is consistent with an extending direction of the second grooves, second slide sub-portions are protrusively disposed at positions where the second slide portions correspond to the second sub-grooves, and the second slide sub-portions are inserted into the second sub-grooves.

17. The display device as claimed in claim 3, wherein the slide elements comprise connection portions, each of the connection portions is connected between two adjacent sub-slide elements, an extending direction of each of the connection portions is consistent with the extending direction of the first gap.

18. The display device as claimed in claim 17, wherein the sub-slide elements and the connection portions are integrated in one piece.

19. The display device as claimed in claim 1, wherein the middle frame component comprises a plurality of the middle frame bodies disposed in a juxtaposition manner along the sliding direction of the slide elements, and any two adjacent middle frame bodies are connected rotatably.

20. The display device as claimed in claim 1, wherein the display device comprises a plastic frame, the plastic frame is attached to a side of the slide elements facing away the support surface, and the display screen is attached to a side of the plastic frame facing away the slide elements.

* * * * *